Oct. 24, 1944. M. J. BROWN 2,361,172
ELECTRONIC POWER FACTOR RELAY OVERLOAD PROTECTION
Filed July 31, 1940 2 Sheets-Sheet 1

WITNESSES:
Leon M. German

INVENTOR
Myron J. Brown.
BY
Paul E. Friedemann
ATTORNEY

Oct. 24, 1944.  M. J. BROWN  2,361,172
ELECTRONIC POWER FACTOR RELAY OVERLOAD PROTECTION
Filed July 31, 1940  2 Sheets-Sheet 2
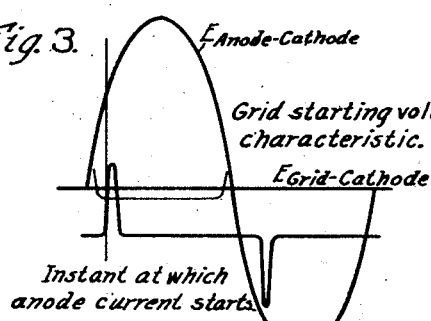
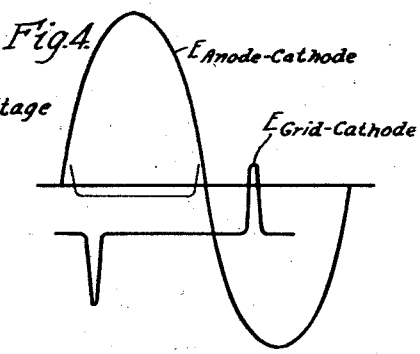
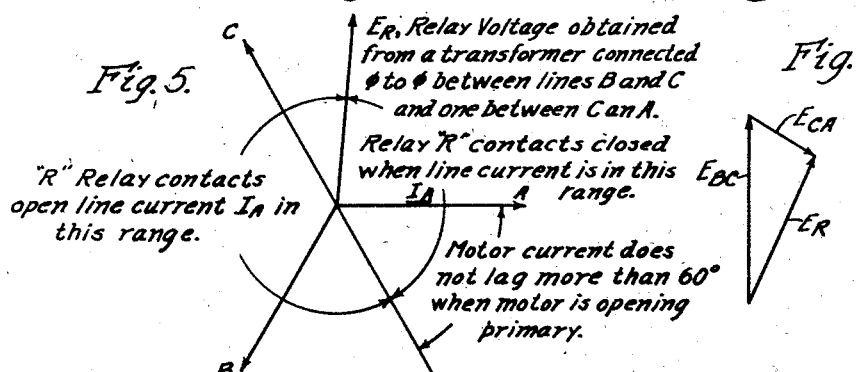
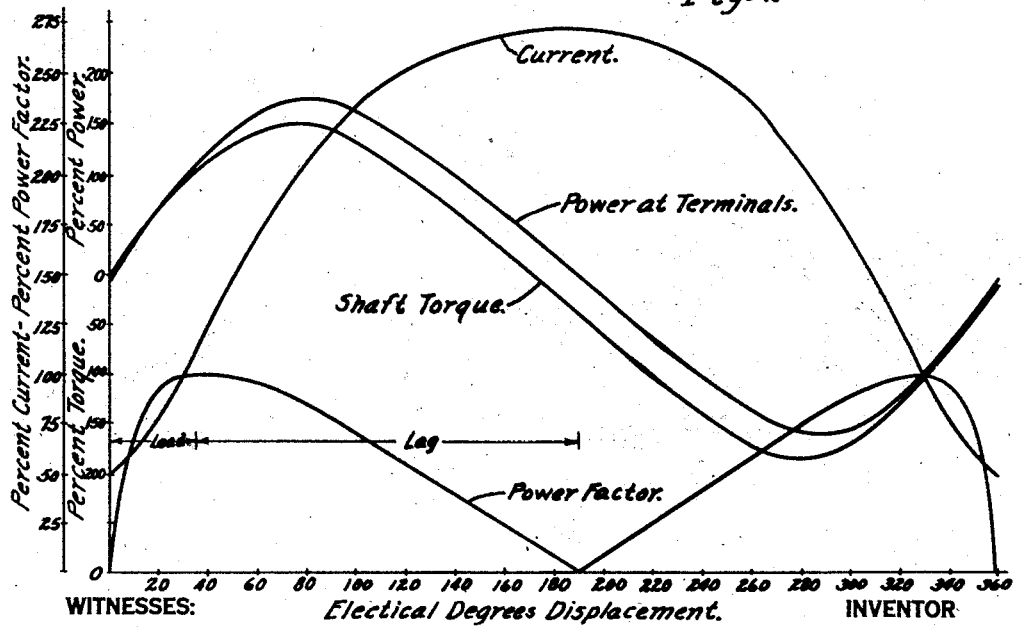
WITNESSES:  INVENTOR
Leon M. Garman  Myron J. Brown
BY
Paul E. Friedemann
ATTORNEY Patented Oct. 24, 1944

2,361,172

UNITED STATES PATENT OFFICE 2,361,172

ELECTRONIC POWER FACTOR RELAY OVERLOAD PROTECTION

Myron J. Brown, Wilkinsburg, Pa., assignor to Westinghouse Electric & Manufacturing Company, East Pittsburgh, Pa., a corporation of Pennsylvania Application July 31, 1940, Serial No. 348,795

9 Claims. (Cl. 172—289)

My invention relates to motor control systems, and more particularly to electronic means for protecting synchronous motors during pull-out.

It is well known that an excessive overload on a synchronous motor will cause it to slip out of synchronism and thus draw an excessive load current as the displacement angle approaches and passes through 180° out of phase. It is very desirable with control for synchronous motors to include protection against out-of-synchronous operation.

I am aware that others have attempted and to an extent succeeded in providing such control. With such prior art devices or systems of control, provision is made to deenergize the field windings to thus cause the motor, after pull-out, to operate as a true induction motor. In some instances, where the load can be removed from the motor, automatic means remove such overload and the motor comes up to nearly synchronous speed as an induction motor. More often than not an overload is only of a temporary character anyway, and thus automatically removes itself during induction motor operation. After such pull-out the field excitation is reapplied automatically in a definite time interval and the synchronous motor is resynchronized.

All the prior art systems of control for the function desired include at least two electromagnetic devices and sometimes many more than two. These electromagnetic devices are sluggish and can be used only to satisfaction with quite large synchronous motors. On large motors the pull-out is slow and there is thus ample time to detect pull-out conditions before the machine has actually completely slipped a pole. With small motors the prior art devices are thus practically useless.

One object of my invention is to provide efficient, reliable and expeditious pull-out protection for all sizes of motors.

Another object of my invention is the provision of substantially inertialess, that is, electronic control means, responsive to the power factor of a synchronous motor, for protecting such synchronous motor against asynchronous operation with the field windings excited.

The objects just recited are merely illustrative. Other objects and advantages will become more apparent from a study of the following specification when taken in conjunction with the accompanying drawings, in which:

Figs. 3, 4, 5 and 6 show some operating characteristics of my system of control; and Fig. 7 shows some typical characteristics of a synchronous motor operating on overload.

Figures 1, 2:
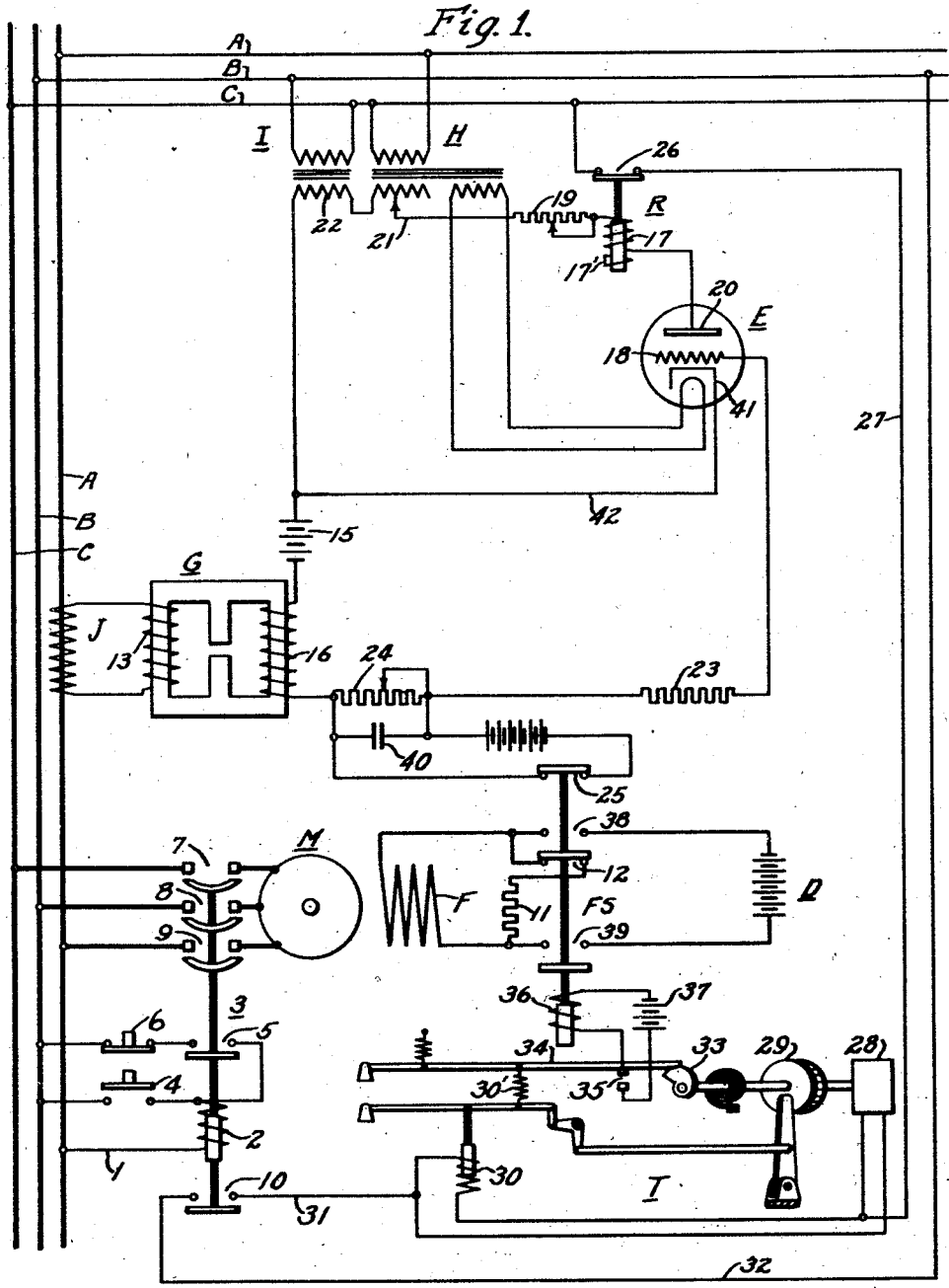
Figure 1 is a diagrammatic showing of a system of control embodying my invention.
Fig. 2 is a partial view showing a modification of Fig. 1.

Referring to the drawings, M indicates the synchronous motor to be protected and E the electronic means or electric discharge device responsive to the power factor of the motor M. While an electric discharge device of the gaseous type, such as a thyratron, having an anode 20, a cathode 41, a control electrode or grid 18 and a gaseous medium is shown, other discharge devices of the arc discharge type, such as a discharge device of the immersed-ignition electrode type, or even of the high vacuum type may be utilized. R represents the control relay energized by the electric discharge device E. T represents a timing device for effecting normal time-limit synchronization of the motor M through control of the operation of the field switch FS for connecting the field winding F to the battery D or other source of direct current. While a motor-operated timer is shown it will be understood that other suitable timers well known in the art may be utilized. G, H, I and J represent transformer means for energizing the control circuits.

A better understanding of my invention can probably be had from a study of a typical sequence of starting of a synchronous motor and of the operation of my devices during pull-out of such synchronous motor M. Before and during the starting period, the operating coil 36 of the field switch FS is in the deenergized condition so that contact members 25 are closed. A circuit is established through the closed contact members 25 for connecting the resistor 24 and capacitor 40 across a source of direct current, shown as a battery. It will readily be understood, however, that any suitable source of direct current such as a rectifier energized from the alternating current buses may be utilized. Resistor 24 is also connected in the grid circuit of discharge device E. The grid circuit extends from grid 18 through resistor 23, resistor 24, secondary winding 16 of transformer G, source of negative bias 15 to the cathode 41. It will readily be understood that a negative bias derived from the alternating current buses, but 180 degrees out of phase with respect to the anode cathode voltage of discharge device E may be utilized in place of battery 15.

Fig. 2 shows one method of obtaining an alternating current biasing potential. An impedance 14 is connected from adjustable tap 21 across the series connected secondary windings of transformers H and I. The junction of tap 21 and impedance 14 is connected to impedance 19. The intermediate tap on impedance 14 is connected to cathode 41. The junction of secondary winding 22 and impedance 14 is connected to the upper end of secondary winding 16 of transformer G. The voltage thus impressed across resistor 24 is such that it renders the discharge device E conducting and a conducting circuit is established from adjustable tap 21 through adjustable impedance 19, coil 17 of relay R, anode 20, cathode 41, conductor 42 through the secondary winding 22 of transformer I, transformer secondary winding of transformer H, back to tap 21. Operating coil 17 becomes energized and relay R is actuated to close contact members 26. A short-circuited coil 17' or lag loop or any other time delay means may be utilized on relay R to prevent chattering of the contact members 26 or to prevent the opening of the contact members 26 as the result of a momentary disturbance on the system.

The operation is as follows: Assuming the buses A, B and C are energized with alternating current and the attendant actuates starting push-button switch 4, then a circuit is established from bus A through conductor 1, actuating coil 2 of the main line contactor 3 and the switch 4 to bus B. Operation of contactor 3 closes contact members 5 to establish a holding circuit for coil 2 through stop switch 6. Operation of contactor 3 also effects closing contact members 7, 8, 9 and 10. Closure of contact members 7, 8 and 9 connects the motor M to the buses A, B and C, and the motor M starts operating as an induction motor. Alternating current is induced in the field winding during induction motor operation and the frequency varies with the slip. To protect the field insulation the slip frequency current of the field discharges through the resistor 11 connected to the field terminals by the back contact members 12 of the field contactor or switch FS.

The closing of contact members 10 establishes a circuit from the energized bus C through the now closed contact members 26, conductor 27, motor 28 and solenoid 30 in parallel, conductor 31, contact members 10, conductor 32 to the energized bus B.

Solenoid 30 actuates the mechanical clutch 29 to couple the motor 28 to the cam 33. The timing motor 28 thus operates the cam 33 in a clockwise direction through clutch 29 and after a predetermined time interval the lever 34 is rapidly actuated by spring 30' and contact members 35 are closed. The operating coil 36 is thus connected to a suitable source of power, such as battery 37, and on becoming energized, coil 36 actuates field switch FS to close contact members 38 and 39, thereby connecting field F to a source of direct current D. While the motor 28 may be maintained in the energized condition after the timing cycle has been completed, it will readily be understood that a pair of back-contacts may be connected in the circuit of motor 28 and actuated by lever 34 at the end of the timing cycle so that the motor may then be deenergized.

To maintain the electric discharge device E conducting for a predetermined time after the field F has been connected to the source of direct current, the capacitor 40, since it takes time to discharge it, impresses a positive voltage on the circuit of the grid 18 for a predetermined time sufficient to allow for the completion of the synchronization of motor M.

Since the motor M draws current as soon as it is connected to the buses A, B and C, the primary winding 13 of the impulse transformer, or peaking transformer, G is energized from the current transformer J. The output of the secondary winding 16 of the impulse transformer G is of a very peaked wave form compared to the wave form of the alternating current impressed on the motor M. The maximum value of the peaked waves or impulses are normally substantially in phase with the zero point on the current wave of the motor armature. This wave or impulse is such that it will render the discharge device E conducting at a point in the positive half cycles of anode to cathode voltage when it equals or exceeds the grid starting voltage characteristic of the discharge device. Fig. 3 indicates variations of the various curves showing the electric discharge device characteristics. Fig. 3 shows a set of conditions that will cause anode current to flow, whereas Fig. 4 shows a set of conditions when no anode current is caused to flow.

During the starting period of the motor, low power factor conditions exist in the motor circuits. The phase position of the positive grid voltage impulses will thus be such as to be ineffective to render the discharge device E conducting. For example, the positive impulse of the grid voltage may fall in the negative portion of the anode-cathode voltage, as shown in Fig. 4. However, as hereinbefore explained, sufficient grid voltage potential is impressed across resistor 24 to render the discharge device conducting and the potential impulse from transformer G is ineffective to control discharge device E at this time. The relay coil R remains energized and contact members 26 are closed.

After the synchronization of motor M has been completed, voltage sufficient to render discharge device E conducting is no longer impressed on resistor 24 from capacitor 40 or the direct current source. The grid potential derived from impulse transformer G is now effective to control the operation of discharge device E. Assuming the power factor is correct, or desirable, then the conditions substantially as shown in Fig. 3 are obtained on the electric discharge device E. Discharge device E continues to conduct and relay R remains energized.

The average current to coil 17 of relay R will now vary with the power factor of the motor M, since the starting impulse from the peaking transformer G may start anode current anywhere in the positive half cycle. This will be apparent from Fig. 1, showing the peaking transformer connected to grid 18 of the discharge device E, and Fig. 3, showing the relation of the voltage peak to the grid starting voltage characteristic.

It will be apparent from Figs 3 and 4 that at some phase angle where the anode current is started late in the positive half cycle of anode voltage, the average current will be insufficient to cause relay R to operate or to remain in the energized position. The latest point on the anode voltage at which the relay R will just operate may be readily adjusted by means of an adjustable resistor 19 in the circuit of the anode 20. This adjustment changes the average current through coil 17 by changing the instantaneous values of anode current. This adjustment determines one of the boundaries of the phase angle at which relay R will operate. Having this point adjustable is a distinct advantage. The other boundary is determined by the magnitude of the anode-cathode voltage and its phase relation with the grid voltage. It is the earliest point on the positive half cycle at which the tube may be rendered conducting. This point is adjustable by shifting the phase of the anode-cathode voltage with respect to voltage impressed on the motor. One way that this may be accomplished is by adjusting the tap 21 on transformer H. The resulting voltage conditions are shown in Figs. 5 and 6. Other phase shifters well known in the art may be utilized to change the phase relation between the anode cathode voltage and the voltage impressed on the motor M.

In the event of an overload or any other abnormal condition causing the motor M to pull out of step or out of synchronism, the power factor becomes very badly lagging as may be seen from Figs. 5 and 7. The voltage conditions on the discharge device thus become substantially as shown in Fig. 4. Discharge device E is rendered non-conducting, relay R becomes deenergized and contact members 26 open. The motor 28 and the solenoid 30 thus also become deenergized. Contact members 35 open to deenergize coil 36 of field switch FS, thus removing the excitation from field F. The motor M then operates as an induction motor. The contact members 25 on field switch FS close to connect the resistor 24 across the source of direct current, thereby again rendering discharge device E conducting. The motor is then re-synchronized in accordance with the cycle of operation hereinbefore explained for the starting of the motor.

If, during the timing cycle of the motor 28, the overload or other cause of the pull-out has ceased, the motor remains synchronized, and on the other hand, if the overload is still present the field is again disconnected and the timing cycle is repeated.

I am, of course, aware that others, after having had the benefit of my teachings, may devise similar systems of control for the same and for similar purposes. I, therefore, do not wish to be limited to the specific showing made, but wish to be limited only by the scope of the claims hereto appended.

I claim as my invention:

1. In a system of control for a synchronous motor, in combination, a synchronous motor, a source of alternating current for the synchronous motor, means for connecting the motor armature to said source, an impulse transformer connected in the armature circuit of a synchronous motor to produce voltage impulses of a given magnitude and a given phase relation to the armature current of the synchronous motor, means for adjusting the phase relation of the voltage impulse and the said armature current, a voltage transformer responsive to the voltage supplied to the synchronous motor from said source of alternating current, and producing an output voltage having a given magnitude and a given phase relation to the armature voltage, means for adjusting the phase relation of the voltage output and the armature voltage, an electronic discharge tube having an anode and a cathode connected to be energized by the output voltage of the voltage transformer and having a grid connected to be responsive to the voltage impulses produced by the impulse transformer, the relation of the voltages on the anode, cathode, and grid being so selected that said discharge tube becomes conducting upon the occurrence of a given power factor of the motor, a field winding for the synchronous motor, a source of excitation for the field winding, and means responsive to the operation of the tube to disconnect the direct current excitation from the said synchronous motor.

2. In a system of control for a synchronous motor, in combination, a source of alternating current, a source of direct current, a synchronous motor having an armature winding and a field winding, main means for connecting the armature winding to the source of alternating current, field switching means for connecting the field winding to the source of direct current, time limit means adapted to effect operation of the field switching means a definite time interval after the operation of the main switching means, inertialess electronic means having principal electrodes, namely, a cathode and an anode, subject to the voltage of the source of alternating current and having a control electrode subject to the armature current of said motor, means for adjusting the voltage relation of the electrodes of said electronic means to such values that said electronic means is caused to carry a current proportional to the power factor of said synchronous motor, and means, responsive to the current of said electronic means, for actuating said field switching means to open the circuit connecting the field winding to said source of direct current when said motor falls out of synchronism.

3. In a system of control for a synchronous motor, in combination, a synchronous motor having an armature winding and a field winding, a source of alternating current, means for connecting the armature winding to the source of alternating current, a source of direct current, switching means for connecting the field winding to said source of direct current and for disconnecting said field winding from said source of direct current depending on the operation of said switching means, and inertialess electronic means responsive to the power factor of said synchronous motor for controlling said switching means to disconnect the field winding from said source of direct current when said synchronous motor falls out of synchronism.

4. In a system of control for a synchronous motor, in combination, a synchronous motor having an armature winding and a field winding, a source of alternating current, means for connecting the armature winding to the source of alternating current, a source of direct current, switching means for connecting the field winding to said source of direct current and for disconnecting said field winding from said source of direct current depending on the operation of said switching means, inertialess electronic means responsive to the power factor of said synchronous motor for controlling said switching means to disconnect the field winding from said source of direct current when said synchronous motor falls out of synchronism and electromagnetic time limit means, set in operation by said switching means, for again connecting said field winding to said source of direct current a predetermined interval of time after said synchronous motor falls out of synchronism.

5. In a system of control for a synchronous motor, in combination, a synchronous motor having an armature winding and a field winding, a source of alternating current, means for connecting the armature winding to the source of alternating current, a source of direct current, switching means for connecting the field winding to said source of direct current and for disconnecting said field winding from said source of direct current depending on the operation of said switching means, inertialess electronic means having two principal electrodes, namely an anode and a cathode, and a control electrode, said principal electrodes being connected to said source of supply to be subject to the voltage variations of the energy supplied to the said motor armature winding and said control electrode being connected in the armature circuit of said motor to be subject to the variations in voltage of the current carried by the armature winding of said motor, means for adjusting the operating characteristics of said electronic means so that the current carried by the principal electrodes is a function of the power factor of said motor, and means, responsive to a certain current value of the current carried by the principal electrodes, for causing the operation of said switching means to disconnect said field winding from said source of direct current.

6. In a system of control for a synchronous motor, in combination, a synchronous motor having an armature winding and a field winding, a source of alternating current, means for connecting the armature winding to the source of alternating current, a source of direct current, switching means for connecting the field winding to said source of direct current and for disconnecting said field winding from said source of direct current depending on the operation of said switching means, inertialess electronic means having two principal electrodes, namely an anode and a cathode, and a control electrode, said principal electrodes being connected to said source of supply to be subject to the voltage variations of the energy supplied to the said motor armature winding and said control electrode being connected in the armature circuit of said motor to be subject to the variations in voltage of the current carried by the armature winding of said motor, means for adjusting the operating characteristics of said electronic means so that the current carried by the principal electrodes is a function of the power factor of said motor, means responsive to a certain current value of the current carried by the principal electrodes, for causing the operation of said switching means to disconnect said field winding from said source of direct current, and timing means set in operation by the operation of said switching means for again connecting said field winding to said source of direct current a predetermined interval of time after the operation of the means responsive to a certain current value of the current carried by the principal electrodes.

7. In a system of control for a conventional synchronous motor, in combination, an electric discharge device having an anode, a cathode, and a control electrode, said anode and cathode being connected to be responsive to the alternating voltage of the supply of alternating current for the synchronous motor, adjustable means for shifting the phase angle of the voltage alternations on the anode and cathode to any selected phase angle with reference to the phase angle of the voltage of the alternating current supply, adjustable means for subjecting the control electrode to a voltage impulse having any selected magnitude and any selected phase angle with reference to the phase angle of the load current drawn by the motor, said two named adjustable means being so adjusted that the phase angle of the voltage impulse on the control electrode in relation to the phase angle of the voltage on the anode and cathode is such that the current flowing through the anode and cathode is a measure of the power factor of the motor whereby an abrupt change in the current flowing between anode and cathode is produced upon pullout of the synchronous motor, and means responsive to such abrupt change in current value of the current flowing between anode and cathode to change the operating characteristics of the motor from synchronous motor operation to induction motor operation.

8. In a system of control for a synchronous motor, in combination, a synchronous motor having an armature winding, a source of supply of alternating current, means for connecting the armature winding to said source of supply, an adjustable impedance, a voltage transformer having its primary winding connected to said source of supply and having a secondary winding, a discharge tube having an anode, a cathode, and a control electrode, a relay, an actuating coil therefor, a circuit including the anode, the cathode a selected portion of the secondary winding of the voltage transformer, the adjustable impedance, and the actuating coil of the relay, an impulse transformer having a primary winding and a secondary winding, the primary winding of the impulse transformer being interconnected with the armature winding of the motor, a second adjustable impedance means, a source of biasing voltage, a resistor, a control circuit including the cathode, the control electrode, the resistor, the adjustable impedance, the secondary winding of the impulse transformer, and the source of biasing voltage, the adjustment of said two adjustable impedance means being so made that the current through the anode and cathode is proportional to the power factor of the motor, whereby said relay is caused to operate at a given power factor.

9. In a system of control for a synchronous motor, in combination, a synchronous motor having an armature winding, a source of supply of alternating current, means for connecting the armature winding to said source of supply, an adjustable impedance, a voltage transformer having its primary winding connected to said source of supply and having a secondary winding, a discharge tube having an anode, a cathode, and a control electrode, a relay, an actuating coil therefor, a circuit including the anode, the cathode a selected portion of the secondary winding of the voltage transformer, the adjustable impedance, and the actuating coil of the relay, an impulse transformer having a primary winding and a secondary winding, the primary winding of the impulse transformer being interconnected with the armature winding of the motor, a second adjustable impedance means, a source of biasing voltage, a resistor, a control circuit including the cathode, the control electrode, the resistor, the adjustable impedance, the secondary winding of the impulse transformer, and the source of biasing voltage, the adjustment of said two adjustable impedance means being so made that the current through the anode and cathode is proportional to the power factor of the motor, whereby said relay is caused to operate at a given power factor, and means responsive to the operation of the said relay for changing the operation of the motor from synchronous motor operation to induction motor operation.

MYRON J. BROWN.